US011231973B2

(12) United States Patent
Subbiah et al.

(10) Patent No.: US 11,231,973 B2
(45) Date of Patent: Jan. 25, 2022

(54) INTELLIGENT BUSINESS LOGGING FOR CLOUD APPLICATIONS

(71) Applicant: SAP SE, Walldorf (DE)

(72) Inventors: Sivaram Subbiah, Bangalore (IN); Ranjit Alapati, Vijayawada (IN)

(73) Assignee: SAP SE, Walldorf (DE)

( * ) Notice: Subject to any disclaimer, the term of this patent is extended or adjusted under 35 U.S.C. 154(b) by 670 days.

(21) Appl. No.: 15/652,587

(22) Filed: Jul. 18, 2017

(65) Prior Publication Data

US 2019/0026163 A1    Jan. 24, 2019

(51) Int. Cl.
*G06F 9/54*     (2006.01)
*G06F 11/34*    (2006.01)
*G06F 11/30*    (2006.01)

(52) U.S. Cl.
CPC .......... *G06F 9/542* (2013.01); *G06F 11/302* (2013.01); *G06F 11/3068* (2013.01); *G06F 11/3476* (2013.01); *G06F 2201/86* (2013.01)

(58) Field of Classification Search
CPC .... G06F 9/542; G06F 11/302; G06F 11/3476; G06F 11/3068; G06F 2201/86
See application file for complete search history.

(56) References Cited

U.S. PATENT DOCUMENTS

| 9,501,345 B1* | 11/2016 | Lietz ............... G06F 16/00 |
| 2006/0075308 A1* | 4/2006 | Haselden ......... G06F 11/3476 714/39 |
| 2014/0149466 A1* | 5/2014 | Sato ................ G06F 16/21 707/803 |
| 2015/0039757 A1* | 2/2015 | Petersen ........... H04L 41/16 709/224 |
| 2018/0232425 A1* | 8/2018 | Das ................ G06F 16/2471 |
| 2019/0012217 A1* | 1/2019 | Twist .............. G06F 9/541 |

OTHER PUBLICATIONS

"SmartInspect Executive Summary," Gurock Software, 4 pages, no date available.
"TraceTool 9: The Swiss-Army knife of trace," from http://tracetool.sourceforge.net/, 20 pages, printed Apr. 10, 2017.

* cited by examiner

*Primary Examiner* — Doon Y Chow
*Assistant Examiner* — Kimberly L Jordan
(74) *Attorney, Agent, or Firm* — Sterne, Kessler, Goldstein & Fox P.L.L.C.

(57) ABSTRACT

Disclosed herein are system, method, and computer program product embodiments for operations related to intelligent action logging for cloud applications. An embodiment operates by identifying an event associated with an application executing on the processor. The event is compared to criteria for logging the event in one or more of a plurality of logs. The log includes its own unique criteria for logging the event. If it is determined that the event satisfies the criteria of the action log, then detail about the event are written onto an action log using a log format associated with the action log, which is different from a log format of a technical log.

12 Claims, 5 Drawing Sheets

INTELLIGENT BUSINESS LOGGING FOR CLOUD APPLICATIONS

BACKGROUND

When an application maintains a log, an application developer can use the log to diagnose the functionality of the application, particularly technical issues which may arise, during operation of the application or execution of the associated program. The application usually writes these logs in a language that can be understood only with some difficulty, and often only by the application developer. However, an application developer is not the only user who might benefit from being able to view and access a log of functions executed during an instance of the application. These other users, however, may be business users, i.e. personnel who use the application during execution of business related tasks. Such business users may find it difficult to use or even understand the logs intended mainly for application developers.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for intelligent business logging for cloud applications.

Figure 1:
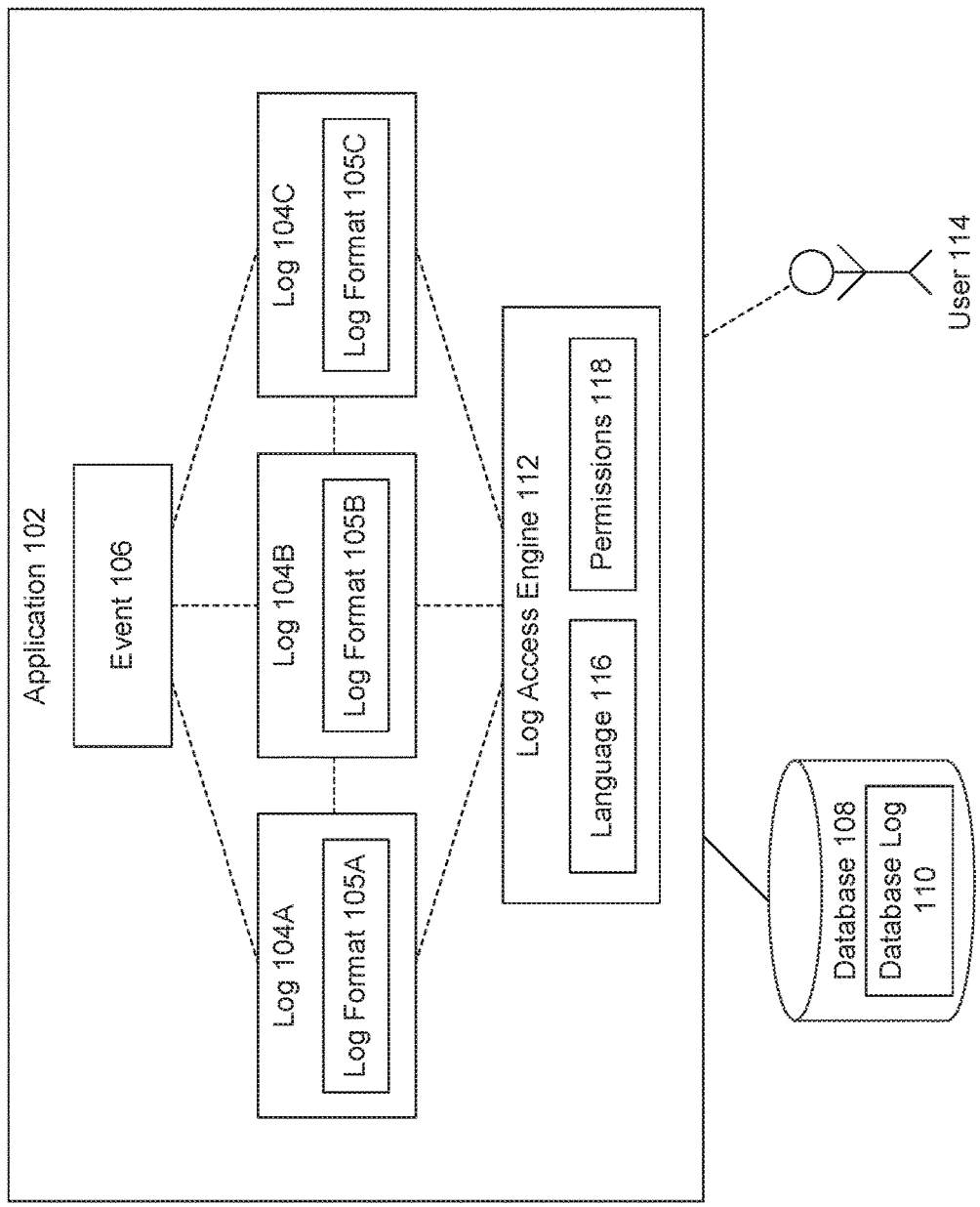
FIG. 1 is a block diagram showing example operations related to intelligent business logging for cloud applications, according to some embodiments.

FIG. 1 is a block diagram 100 showing example operations related to intelligent business logging for cloud applications, according to some embodiments. An application 102 may be any application, program, or app used to perform various functionality. Application 102 may be a web app or cloud based application that makes its data and functionality available to different distributed users or computing devices simultaneously. Application 102 may maintain data consistency across multiple parallel or simultaneous data accesses and updates across multiple user accounts.

In an embodiment, application 102 may be configured to maintain a plurality of log files 104A-C. Although 3 log files 104 are shown in FIG. 1, in practice application 102 may maintain any number of log files 104. Logs 104 may be files in which various details about events 106 are recorded. In an embodiment, an event 106 may be a particular defined action (such as a save command) or may include multiple actions which may be logged or buffered leading up to and/or following particular defined events. For example, the data or keystrokes entered prior to the save command may be logged as part of the save event 106.

In some embodiments, rather than maintaining a single log file generated for a technically-inclined user such as an application developer or software programmer, application 102 may generate and maintain multiple log files 104 in parallel, each with its own unique and/or overlapping data. In an embodiment, each log file 104 may be specifically designed for a particular user, user type, or user role. Different log files 104 may capture different events 106 or different aspects of the same event 106.

In an embodiment, a single event 106 may be logged across multiple log files 104A-C, wherein each log file 104 has its own unique log format 105A-C. Log format 105 may indicate what information or details about event 106 is to be recorded, which events 106 are to be recorded, which language(s) in which to record or maintain the log 104, which users may access the log 104, which data within the particular log 104 is accessible to different users with different security clearance, a length of time or a lifetime the particular log 104 is maintained before it is deleted or purged from memory, and other configurable details about the log 104. In an embodiment, the lifetime may define an expiry period or retention period of a particular log.

For example, in an embodiment, log format 105 may indicate how long each log 104 is to be maintained. The lifetime of the log may be determined based on user requirements or preferences, technical capabilities, applicable laws, or other factors. Being able to customize the lifetime of each log may enable application 102 to comply with legal requirements (indicating how long a log 104 must be maintained before it can be deleted) and may also save computing resources (such as memory and processing cycles), as well as increase processing capabilities and speed.

For example, assume log 104A includes financial information. In this example, it may be necessary to maintain log 104A for a full year as may be legally required for the maintenance of such financial information. But logs 104B and 104C, which may not include the same financial information, may each be purged on a weekly or even daily basis. This may allow greater access to computer memory or storage that would otherwise be required to maintain log files 104B or 104C if the logs all shared the same lifetime. Also, storing less data in the memory (e.g., by ways of purging log files 104) may improve computer processing capabilities as fewer cycles may be needed to retrieve data or perform searches through logged information.

Different logs 104 may be created or maintained for different users, user types, roles, etc. As such, each log 104 may include its own specific information and data format regarding a particular event 106 that occurs on or is otherwise detected by application 102. In an embodiment, a first log 104A may be for a technical user and may include information about which functions or methods were called, and technical capabilities such as memory or processor usage at different times during event 106. Log 104B may be for an interface designer who is interested in where the user's mouse was focused on the interface and how long the user took to make different keystrokes in performing or requesting event 106. Log 104C may be for a business user who is interested in the actual information input by an end user using application during event 106.

As just described, logs 104A-C may each capture different information using different metadata and in different formats for different users at different levels of granularity all for the same event 106. Or, for example, an event 106 that registers a log-write to log 104A may not register a log-write to log 104C. For example, a sales transaction may trigger a write to a sales log 104, a technical log 104, and an accounting log 104, but may not trigger the generation of or write to a human resources log 104. As such, different logs 104 may be associated with different or overlapping events 106 or different portions of the same event 106.

Event 106 may be an action or plurality of actions defined to trigger a log write. In an embodiment, application 102 may monitor user actions or other functions that may trigger an event 106. In the example of FIG. 1, event 106 may trigger application 102 to write to one or more of logs 104A-C. Event 106 may include, for example, a particular mouse-click, keystroke, menu selection, a combination of actions required by a user to create a new data object, or any other actions performed by user 114 or performed by application 102. In an embodiment, an application developer or other user may define which events 106 are to be monitored, and which details of those events 106 are written to which logs 104.

In an embodiment, application 102 may track events 106 or write to logs 104 on a per-user, per-instance basis. For example, different instances of application 102 may be accessed simultaneously by different users 114. Application 102 may track which actions or events 106 are associated with which users or application instances. These events 106 may then be separately written to logs 104. In an embodiment, logs 104 may include logs that are maintained on a per-user basis. For example, the actions or each configured event 106 performed by a particular user may be tagged across logs 104 and/or maintained in its own unique user-log 104. This may enable searches or groupings of data on a per-user or per-instance basis. In an embodiment, an event 106 may be defined as being an action performed by a particular user, but may not be triggered when performed by a different user.

Application 102 may monitor or detect when any number of previously defined log events 106 occur during an operation or instance of application 102. When an event 106 is detected, based on log format 105 or other information provided with event 106, application 102 may determine to which log(s) 104 the particular event 106 is to be written, and which details surrounding the event 106 are to be written.

In an embodiment, application 102 may access or write to database 108. Database 108 may be a storage structure in which data is organized and stored. In an embodiment, database 108 may include memory, disk, or storage across multiple devices. Database 108 may include its own database log 110. Database log 110 may include a history of actions, transactions, or data updates that change the data of database 108.

In some embodiments, there may be numerous differences between logs 104 as maintained by application 102, and database logs 110. In an embodiment, database logs 110 may include a history of data updates performed on database 108. Logs 104, by contrast, may not hold any data, but instead may include event-related information and/or metadata that refers or relates to the data of database 108. For example, database transaction log 110 may reflect an update of a value of a particular column and row as being changed from 5 to 10, but without knowledge of the structure of the database it would not be possible to know what numbers 5 and 10 refer to. Log 104, by contrast, may include context around the update and may read, for example, "the number of available items was 5 and is now 10."

As just noted, contrary to database log 110 which may simply indicate which values in which columns:rows were updated, transaction logs 104 may be written with context provided with the values, and in a manner that is stand-alone or self-explanatory for different users. For example, as noted earlier, while database log 110 may indicate that the value in table:items in column 1 and row 2 was updated from "5" or "10", there may be no context within database log 110 as to what the values 5 or 10 indicate or refer to. In contrast, a corresponding entry in log 104 may indicate that "<user_id> updated the number of available items from <old_num> to <new_num> on <date>" (using metadata tags instead of actual values, which may be filled in when a user wants to view the log 104). In another embodiment, rather than using metadata placeholders, log 104 may contain actual data values. Or, for example, the metadata placeholders may be replaced with actual data values any time before log access.

A log access engine 112 may monitor or regulate access to log files 104A-C by different users 114. User 114 may be a user or system trying to gain access to log files 104 using a system or user identifier (ID). Log access engine 112 may provide the requesting user 114 with access to the authorized data and/or authorized or corresponding log file(s) 114.

In an embodiment, when user 114 requests access to a log file 104, log access engine 112 may determine which log file 104 and which version of the log file 104 to grant user 114 with access. For example, log access engine 112 may use permissions 118 to determine which log file(s) 104A-C (or portions thereof) to grant to the user 114 (user ID) requesting access.

In an embodiment, permissions 118 may indicate a role of user 114. As noted above, logs 104 may be configured for different users 114 or different user roles. For example, while log 104A is written for the intended audience of an application developer or other technical user, log 104B may be written for a financial user, while log 104B may be written for a human resources user. Based on a role associated with a particular user ID, log access engine 112 may provide access to a preferred or authorized log file 104. In another embodiment, log access engine 112 may also prohibit access to other log files 104. For example, a human resources user may not have access, clearance, or permissions to a financial log file 104B.

In an embodiment, permissions 118 may indicate data or the type of data (of log files 104) a particular user 114 has, or does not have, clearance to access. For example, there may be confidentiality, security, or privacy concerns associated with particular data that has been written to log files 104A-C. Examples of such information may include identification information such as name or social security number information, credit card information, home address, account balance, account numbers, or other information.

While a first user ID may have access to all the data associated with a particular user ID or role, other users may be denied access to particular information from the same log files 104. In an embodiment, the different information or data may be tagged to indicate which information is sensitive, privileged, confidential, or requires a particular level of security clearance or permissions to access. Log access engine 112 may determine, for a user 114, whether the user ID associated with the user has permissions 118 to access all or just a part of the data of the log 104, and may either deny the user access to the log, or otherwise mask, obscure, separate, remove, or replace the sensitive/confidential information or data. However, another user 114 requesting access to the same log 104 may see a different version of the log 104 without any data obscurity. This may enable application 102 to maintain logs 104 to comply with rules, laws, or other regulations regarding privacy of information, while still maintaining useful log data.

As noted earlier, multiple versions of a log file 104 may be maintained in different languages. In an embodiment, a user ID may be associated with a particular language 116. When requesting access to a log file 104, log access engine 112 may determine which language 116 corresponds to the user, and may provide access to the log file 104 corresponding to the identified language preference of the user 114. Or, for example, portions of a log 104 may be translated, in real-time, upon a log request in a particular language 116.

In an embodiment, a user 114 accessing a log file 104A may want to see information contained in one or more of the other log files 104B or 104C. As noted above, information about a particular event 106 may be stored across multiple log files 104 at different levels of granularity or with different details. For example, a technical log file 104A may not include the actual data values entered by a user during an operation of application 102. However, an application developer may find this information useful to debug or understand a particular event 106. Then, for example, application 102 may allow the application developer (with the appropriate permissions 118) to see the information contained in different logs 104 (e.g., about the identified event 106).

In an embodiment, log 104A may include a visual indicator indicating that information about a particular logged event 106 is included in other log files 104B and 104C as well. Then, for example, a user 114 examining log 104A may know that there is other information available (which may be accessible to user 114) to see details about a particular event 106. In an embodiment, the system of FIG. 1 may allow a user to navigate between different log files 104A-C. For example, application 102 may provide navigation buttons that provide access to other logs 104 relevant to a particular 106. In an embodiment, this log information across log files 104A-C may be viewed on the same screen or file.

The log functionality described with respect to application 102 has been described as being contained within application 102. However, in other embodiments, portions of the log and log access functionality may be contained within a library accessible by application 102 or across one or more other applications or programs which may have access to logs 104 written by application 102. Or, for example, logs 104 may be stored on a different processor or database, and log access engine 112 may regulate access to logs 104 from another machine or computing device.

In an embodiment, log format 105 may indicate that an explicit commit is required to persist messages or log details. For example, while application 102 is executing, the user actions and application responses may be logged in a temporary action log or buffer. Prior to writing the logged messages and actions to a log 104, application 102 may prompt the user for confirmation of whether the logged messages should be written responsive to an identified event 106. Or, for example, application 102 may enable the user to modify which message or data is written to log.

The different messages or data written to logs 104 may be tagged based on different criteria. As noted above, the criteria may include an indication as to which user or instance of application is associated with the event 106, a date/time tags, or other tags such as business tags related to particular project names or business categories (e.g., finance, human resources, sales, etc.). In an embodiment, this information may be maintained as metadata corresponding to the logs 104. This metadata may enable contextual searches to be performed on tagged data across one or more logs 104.

Figure 2:
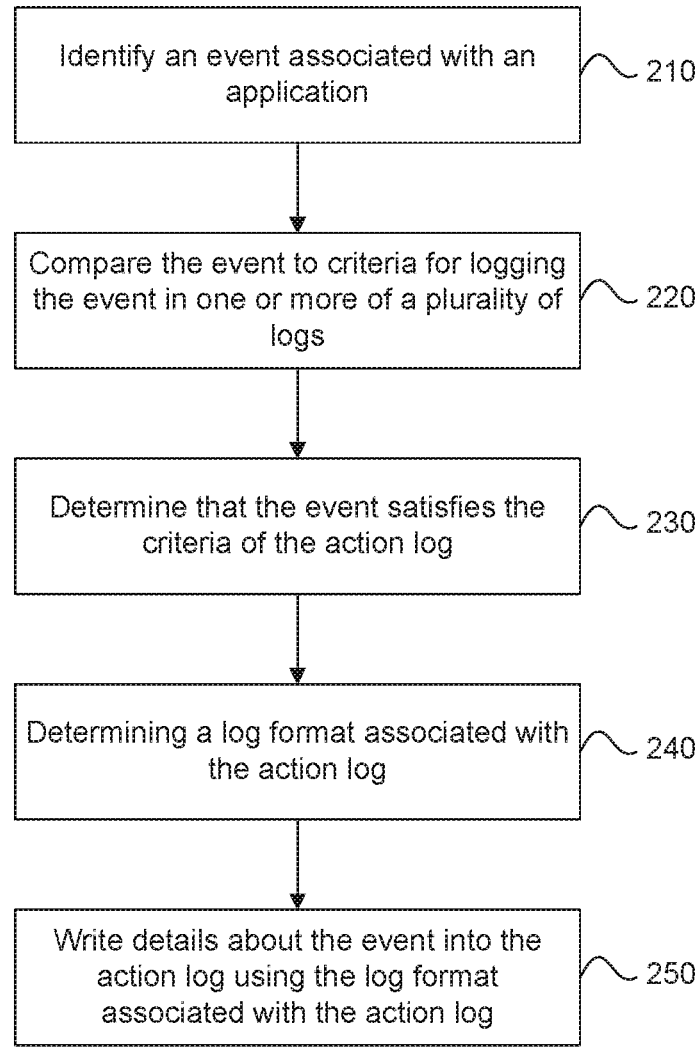
FIG. 2 is a flowchart illustrating a process related to intelligent business logging for cloud applications, according to some embodiments.

FIG. 2 is a flowchart illustrating a process 200 related to intelligent business logging for cloud applications, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 210, an event associated with an application is identified. For example, an event monitor (which may be part of or separate to application 102) may monitor the operations of application 102 to determine when one or more events 106 occur. In an embodiment, event 106 may be defined by an application developer, business user or other user. Such definition may indicate which events 106 and which details about the events are to be logged into different logs 104. In an embodiment, log format 105 may include a unique format for different events 106 within the same log 104 or across different logs 104A-C.

In an embodiment, application 102 may be a cloud-based application operating on a server, and instances of application 102 may be accessible to numerous remote devices accessing application 102 from the server.

At 220, the event is compared to criteria for logging the event in one or more of a plurality of logs. For example, when an event 106 is detected, application 102 or another classification engine may determine which log(s) 104 the event 106 is to be written and what information about the event 106 is to be written to each log. In an embodiment, each log 104 may include its own unique criteria for logging in log format 105.

In an embodiment, logs 104A-C may include various logs including both a technical log and an action log. A technical log (including a database log 110) may log or record technical details associated with the operation of application 102, such as function calls or actions performed by application (including one or more processors upon which application 102 may be operating, including database servers) in response to user actions. An action log, by contrast, may include a log or record of different user actions performed by one or more users 114 operating application 102. In an embodiment, different logs 104 may be maintained for different users 114 across different or multiple instances of application 102.

At 230, it is determined that the event satisfies the criteria of the action log. For example, application 102 may determine that event 106 satisfied the criteria (e.g., log format 105) of one or more of the action logs 104 such that details about the event 106 are to be written to the log(s).

At 240, a log format associated with the action log is determined. For example, log format 105 may indicate which information about event 106 is written to each respective log. In an embodiment, the format of information in one log 104A about event 106 may vary from the format of information in another log 104b about the same event 106. The format of the logs 104 may be configured on a per-user or per-user-role basis. As noted above, the format of a technical log (e.g., which information is included in a technical log) may be different from the information included in a corresponding action log.

At 250, details about the event are written into the action log using the log format associated with the action log. For example, application 102 may write the details specified by log format 105 to one or more logs 104 based on the detection of event 106. In an embodiment, the data written to logs 104 may include placeholders for values extracted from database 108, or may include actual values written directly into log 104. However, the values may be tagged with security data such that log access engine 112 may replace confidential or privacy information prior to providing a particular log 104 to a user 114 who may not have permissions 118 to access the secured or confidential information.

Figure 3:
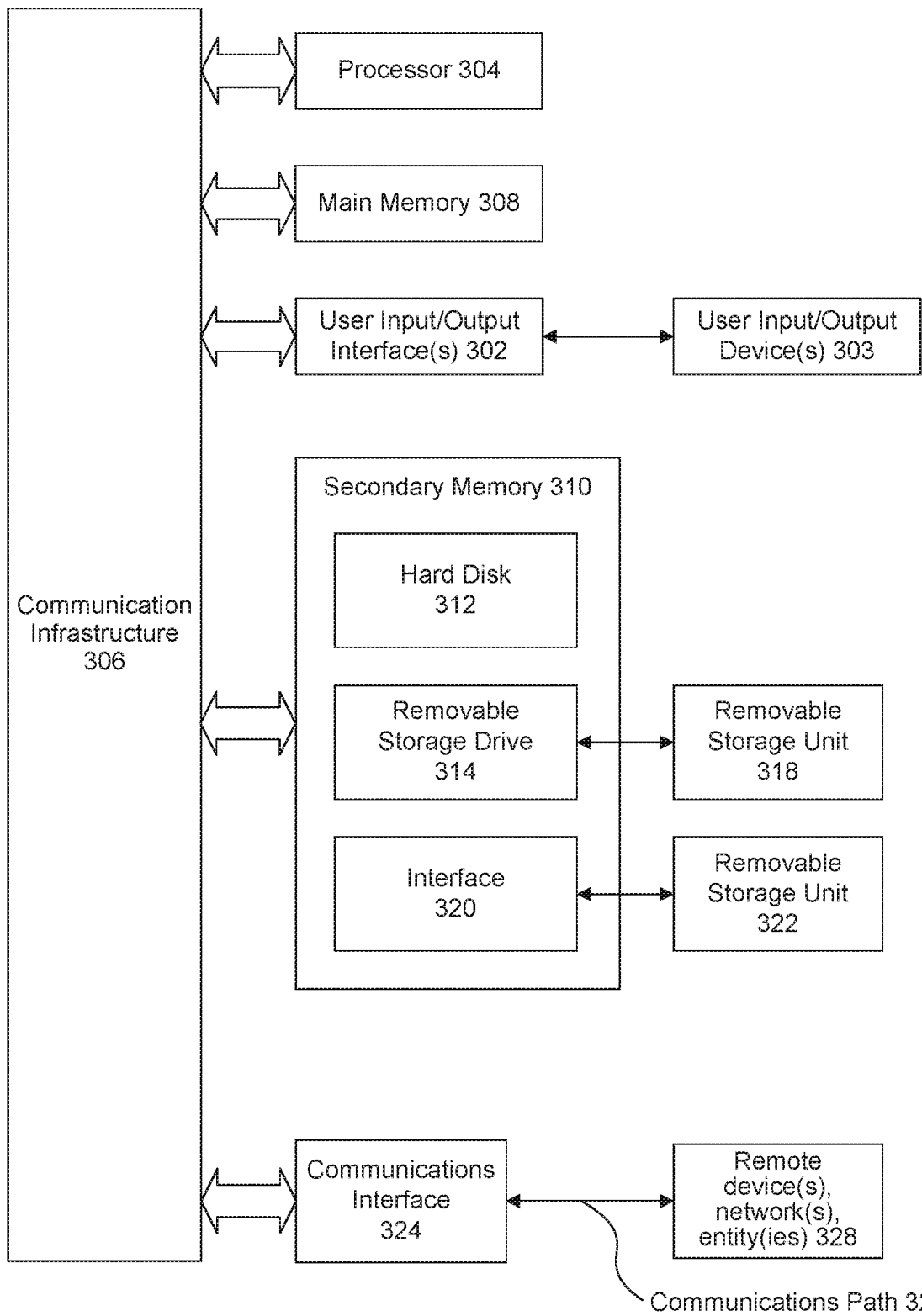
FIG. 3 is an example computer system useful for implementing various embodiments.

Various embodiments can be implemented, for example, using one or more computer systems, such as computer system 300 shown in FIG. 3. Computer system 300 can be used, for example, to implement the systems described herein with respect to the figures, and/or the method of FIG. 2. Computer system 300 can be any computer capable of performing the functions described herein.

Computer system 300 can be any well-known computer capable of performing the functions described herein. Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

Figure 4A:
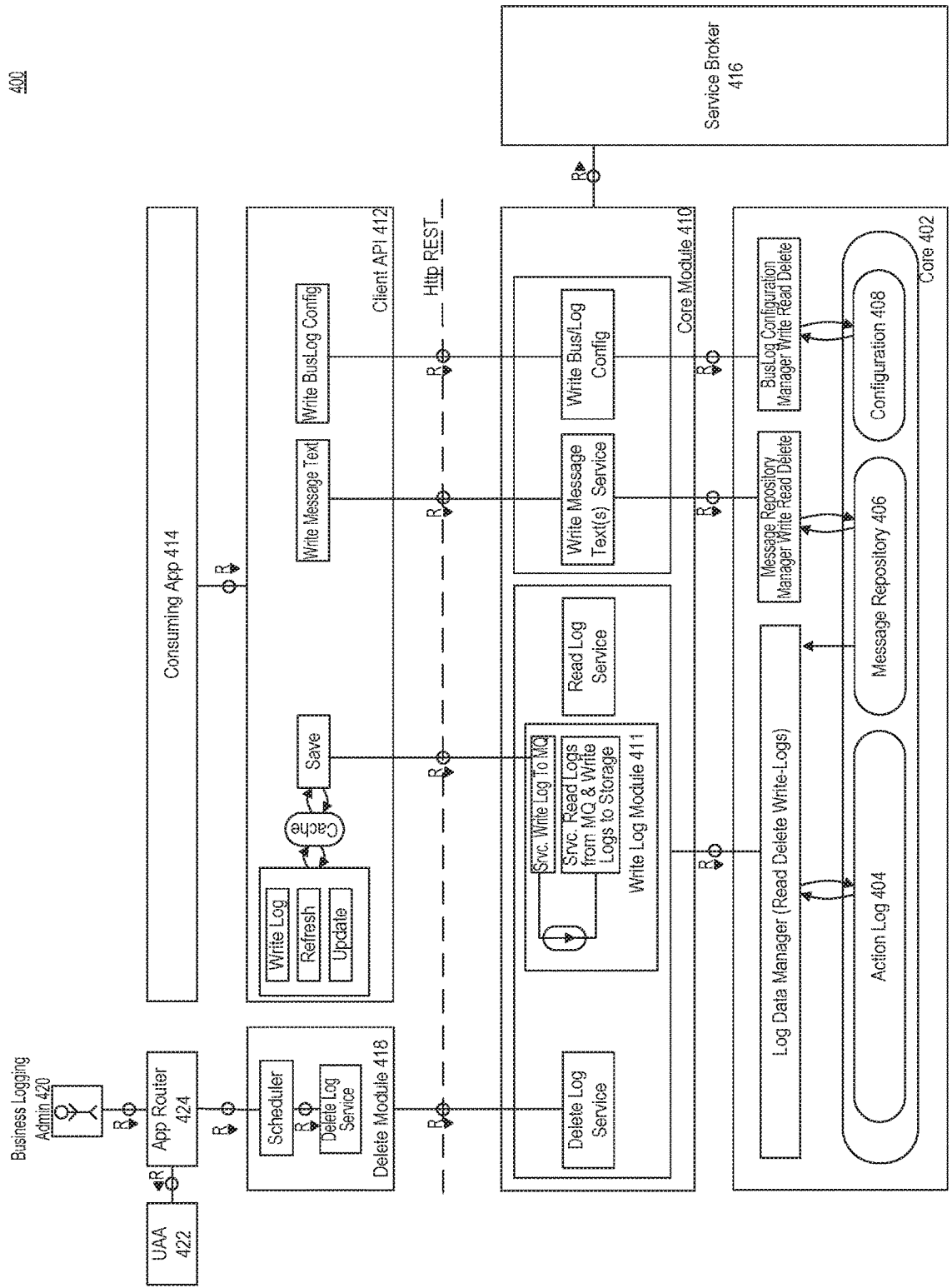
FIGS. 4A and 4B are block diagrams showing example configurations of intelligent business logging within a cloud environment, according to some embodiments.

FIG. 4A is a block diagram 400 showing an example configuration of intelligent business logging within a cloud environment, according to some embodiments. A core 402 may be a data layer that stores and retrieves data related to business logging. In an embodiment, core 402 may include an action log 404, a message repository 406, and/or configuration information 408.

Action log 404 may include actual data received by or from one or more consuming applications 414. Action log 404 may include raw or actual data values that were received as part of various transactions or other functionality performed by consuming application 414. In an embodiment, consuming application 414 may be any application which performs functionality which is logged similar to application 102 of FIG. 1.

Message repository 406 may include a readable log corresponding to a portion of the data of action log 404 and/or the functionality of consuming app 414. Message repository 406 may include preconfigured messages with data placeholders that are filled in at runtime with real-time data from consuming application 414. For example, a message may be: % user % deposited % amount % on % date % into % account_num %. Then, for example, whenever a user deposits money into an account, the actual data values from application 414 may be substituted for the placeholders indicated by the %. These messages with the actual data values may be written to one or more message repositories 406.

Configuration information 408 may include information that associates different consuming applications 414, including portions thereof, or data received from different applications 414 to different logs 404 and/or message repositories 406. For example, a particular application 414 may include both human resources (HR) and payroll information or functionality. Configuration 408 may map the HR information to an HR log 404 and the payroll information to a payroll log 404, and may include a similar mapping for repositories 406. Or, for example, different applications 414 may be mapped to different logs 404 and/or repositories 406.

Core module 410 may include a services layer that issues commands or requests to the core or storage layer 402. Example requests include read, write, and delete commands, to name just some examples.

In an embodiment, a write log module 411 may be a synchronous write module that writes raw/actual data from one or more consuming applications 414 to an action log 404. A client application programming interface (API) 412 may provide one or more applications 414 access to the services layer 410. In an embodiment, the functionality of the services layer 410 may be programming language independent, while the client API 412 may be programming language dependent. In an embodiment, multiple client APIs 412 may exist for different programming languages, each of which provide access to services layer 410.

In an embodiment, business or action log messages may be temporarily stored in buffer. Then for example, when an application 414 issues a 'save' command, the log messages may be cleared from the buffer and transferred to services layer 410 for storage at core 402.

As noted above, services 410 may be accessed via a cloud platform. For example, by knowing the URL (uniform resource locator) of a particular service 410, a device may be able access and/or invoke the service. To secure such end points, a service broker 416 may track, issue, and/or verify credentials of particular users/devices to ensure access is reserved to only authorized devices or applications 414.

In an embodiment, different portions of a particular application 414 may include different credentials allowing access to different services based on configuration data 408. For example, the HR portion of consuming application 414 may not be credentialed to write to the finance log 404. Service broker 416 may deny requests from applications 414 that are not credentialed to perform particular actions or request particular services 410.

In an embodiment, performing a delete operation (e.g., via a delete module 418) may require an extra level of authentication. Delete module 418 may include a scheduler that periodically notifies delete log service of logs 404, or portions thereof, that are to be deleted or garbage collected. For example, as noted above, different logs 404 may have different retention or expiry periods of which scheduler may notify delete log service. Or for example, a business logging administrator 420 may request access to modify or delete logs directly.

In an embodiment, a user account and authentication (UAA) processor 422 in combination with an application router 424 may determine whether or not the administrator 420 is authorized to access the requested functionality. In an embodiment, delete module 418 may provide cost or metering data that tells the admin 420 how much in computing resources and/or financial costs different logs 404 or repositories 406 are consuming. For example, the cost may indicate that each gigabyte of log data stored costs $10/month. Cost module may then provide how much data is being stored with respect to different applications 414 and/or logs 404 over different time periods. Using this cost information, admin 420 may determine which logs to delete (e.g. deleting the oldest and/or most expensive logs 404 or repositories 406).

Figure 4B:
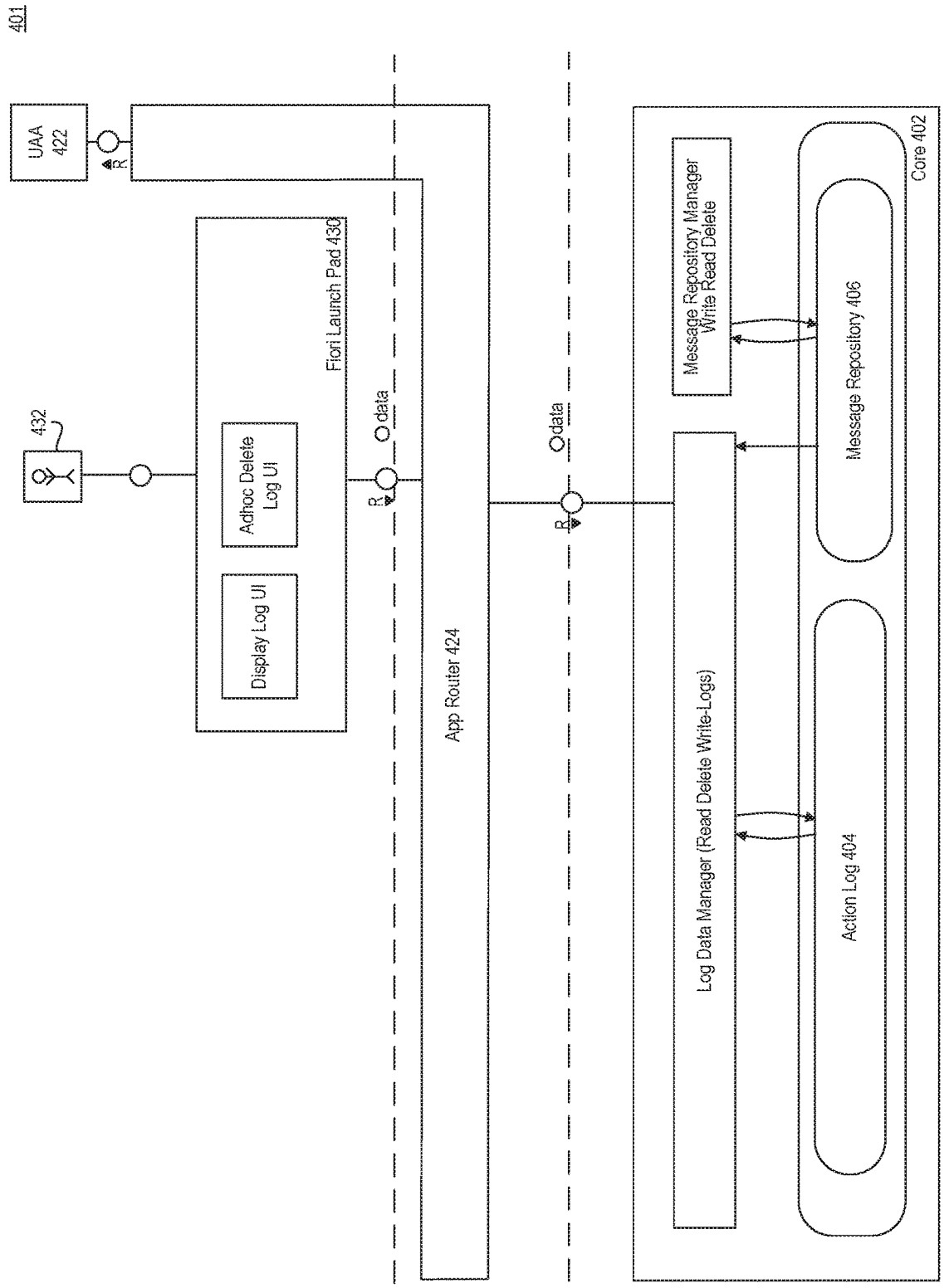

FIG. 4B is a block diagram 401 showing an example configuration of intelligent business logging within a cloud environment, according to some embodiments. In an embodiment, the logged data 404 and messages of repository 406 may be accessed via a centralized user interface 430.

In an embodiment, user interface 430 may a centralized user interface that may be configured or modified on a per user 432 basis. For example, similar to what was discussed above with respect to an admin 420 accessing the delete module 418 (in FIG. 4A), app router 424 and UAA 422 may restrict access to particular logs, data, and/or other information or functionality only to authorized or authenticated users 432. Based on their authentication, user 432 may be provided with a configured interface 430 by which user 432 is able to access log 404 and/or repository 406. In an embodiment, the system may provide two different interfaces 430 to each of two different users 432 which enable the users 432 to access different information, based on their respective credentials, roles, or other authorization or authentication criteria.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
identifying, by a processor, an event associated with an application executing on the processor;
tagging the event with one or more metadata tags based on criteria for logging the event in a plurality of logs, wherein each log comprises unique criteria for logging;
comparing the event to criteria for logging the event in a plurality of logs;
determining that the event satisfies the criteria for logging the event to a first log in the plurality of logs in a format different from a second log in the plurality of logs;
writing details relating to the event into both the first log and the second log, wherein the details further comprises the one or more metadata tags;
tagging the details written to the first log and the second log with a security tag;
receiving a request associated with a particular user identifier to view from the first or the second log the details relating to the event associated with the one or more metadata tags;
determining that the user identifier does include a clearance necessary to view details written to the first log or the second log associated with the security tag; and
providing access to the first or the second log including the details about the event, wherein the first or the second log includes an indicator indicating that details relating to the event exist in a different log in the plurality of logs.

2. The method of claim 1, wherein the first log has a retention period different from a retention period of the second log.

3. The method of claim 1, further comprising:
determining that the first log is an action log, and the second log is a technical log;
receiving a request to view the action log associated with a particular user identifier;
determining that the action log includes confidential information;
determining that the user identifier does not include a clearance necessary to view the confidential information;
replacing the confidential information with replacement information in a new version of the action log; and
providing a user associated with the user identifier with access to the new version of the action log.

4. The method of claim 1, wherein the writing comprises:
writing the details in a plurality of different languages according to the log format of the first log and the second log.

5. The method of claim 1, wherein the criteria for logging on the action log comprises one or more user actions during an execution of the application.

6. The method of claim 5, wherein the criteria for logging on the technical log comprises one or more function calls executed by the application in response to the one or more user actions.

7. A system, comprising:
a memory; and
at least one processor coupled to the memory and configured to:
identify an event associated with an application executing on the processor;
tag the event with one or more metadata tags based on criteria for logging the event in a plurality of logs, wherein each log comprises unique criteria for logging;
compare the event to criteria for logging the event in a plurality of logs;
determine that the event satisfies the criteria for logging the event to a first log in the plurality of logs in a format different from a second log in the plurality of logs;
write details relating to the event into both the first log and the second log, wherein the details further comprises the one or more metadata tags;
tag the details written to the first log and the second log with a security tag;
receive a request associated with a particular user identifier to view from the first or the second log the details relating to the event associated with the one or more metadata tags;
determine that the user identifier does include a clearance necessary to view details written to the first log or the second log associated with the security tag; and
provide access to the first or the second log including the details about the event, wherein the first or the second log includes an indicator indicating that details relating to the event exist in a different log in the plurality of logs.

8. The system of claim 7, wherein the database comprises the transactional data and the analytical data, wherein the analytical data corresponds to the transactional data.

9. The system of claim 7, wherein the processor is further configured to:
provide navigational functionality between the first log and the second log based on the indicator.

10. The system of claim 7, wherein the processor is further configured to:
determine that the first log is an action log, and the second log is a technical log;
receive a request to view the action log associated with a particular user identifier;
determine that the action log includes confidential information;
determine that the user identifier does not include a clearance necessary to view the confidential information;
replace the confidential information with replacement information in a new version of the action log; and
provide a user associated with the user identifier with access to the new version of the action log.

11. The system of claim 7, wherein to write, the processor is configured to:
write the details in a plurality of different languages in the action log according to the log format of the first log and the second log.

12. A non-transitory computer-readable device having instructions stored on a memory thereon that when executed by at least one processor of the device, causes the at least one processor to perform operations comprising:
identifying, by a processor, an event associated with an application executing on the processor;

tagging the event with one or more metadata tags based on criteria for logging the event in a plurality of logs, wherein each log comprises unique criteria for logging;

comparing the event to criteria for logging the event in a plurality of logs;

determining that the event satisfies the criteria for logging the event to a first log in the plurality of logs in a format different from a second log in the plurality of logs;

writing details relating to the event into both the first log and the second log, wherein the details further comprises the one or more metadata tags;

tagging the details written to the first log and the second log with a security tag;

receiving a request associated with a particular user identifier to view from the first or the second log the details relating to the event associated with the one or more metadata tags;

determining that the user identifier does include a clearance necessary to view details written to the first log or the second log associated with the security tag; and providing access to the first or the second log including the details about the event, wherein the first or the second log includes an indicator indicating that details relating to the event exist in a different log in the plurality of logs.

* * * * *